Sept. 12, 1939.　　　　　A. J. ILLER　　　　　2,172,584
STEERING WHEEL PROTECTOR
Filed June 19, 1937
Fig. 1.
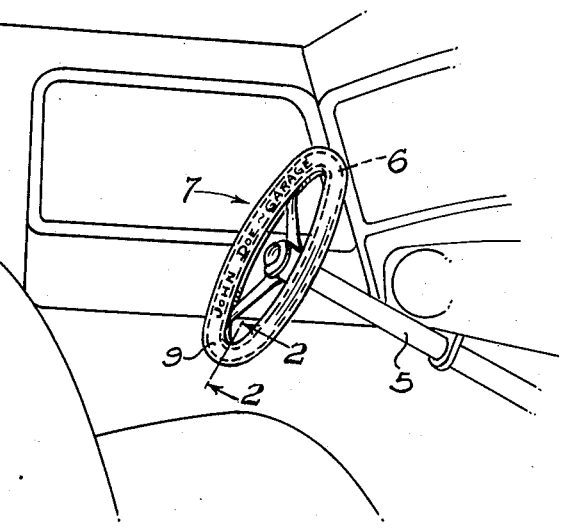
Fig. 2.
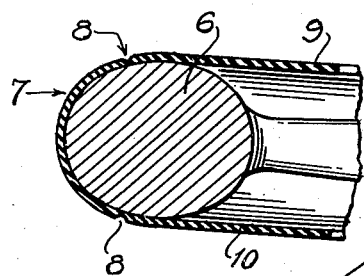
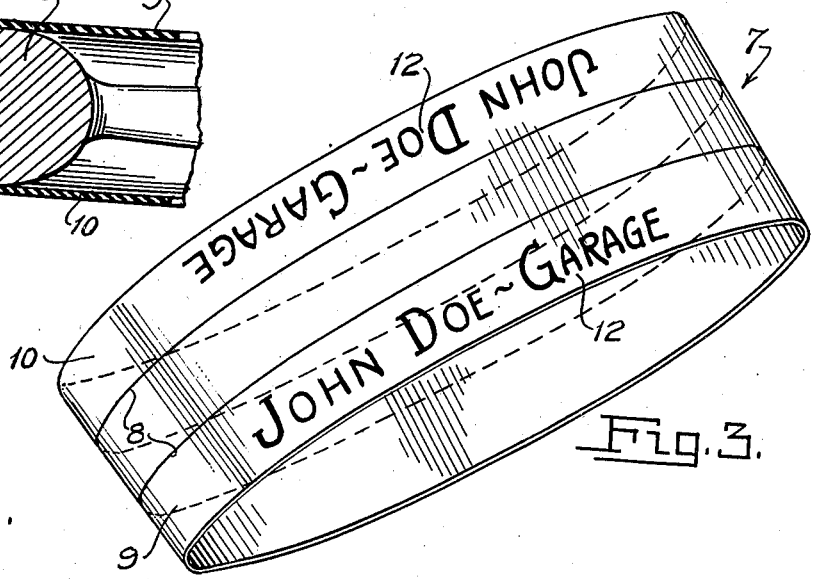
Fig. 3.
Fig. 4.
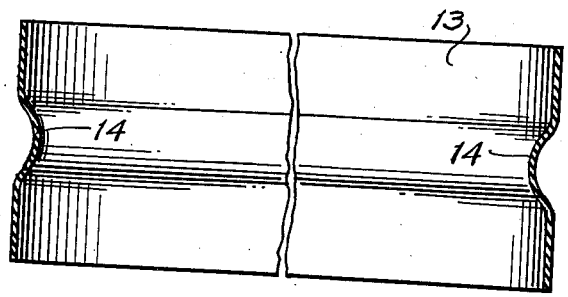
INVENTOR.
Alfred J. Iller
BY Carlos G. Stratton
ATTORNEY.

Patented Sept. 12, 1939

2,172,584

UNITED STATES PATENT OFFICE 2,172,584

STEERING WHEEL PROTECTOR

Alfred J. Iller, La Jolla, Calif., assignor of one-half to Hall G. Holder, La Jolla, Calif.

Application June 19, 1937, Serial No. 149,165

4 Claims. (Cl. 74—558)

My invention relates to a device for protecting the steering wheel of an automobile from grease, oil and the like, or to protect a driver's hands or gloves from grease, oil or the like on the steering wheel.

An important object of my invention is to provide such a protector that is quickly and easily applied and removed from a steering wheel.

Other objects are to provide a continuous, elastic protector for such purpose, and to provide a protector capable of carrying advertising.

The invention also comprises novel details of construction and novel combinations and arrangements of parts, which will more fully appear in the course of the following description.

In the drawing, like reference characters designate similar parts in the several views.

Figure 1 is a perspective view of a steering wheel and associated parts of an automobile, to which wheel has been applied an embodiment of my invention.

Figure 2 is an enlarged, broken section, taken on the line 2—2 of Figure 1.

Figure 3 is an enlarged perspective view of said embodiment.

Figure 4 is a broken, vertical section through a modified construction.

Referring more in detail to the drawing, the reference numeral 5 designates the steering post of an automobile having a steering wheel 6.

The body of my protector has been generally indicated by the reference numeral 7. It comprises a wide, continuous, elastic band of normally limp rubber, which in use is applied around the periphery of a steering wheel, as suggested in Figures 1 and 2.

The band is circumferentially lined or scored in parallel lines, as shown at 8. In use, these scored lines 8 are generally speaking at the edges of the periphery of the steering wheel, as best shown in Figure 2. By this means, it is easily seen when the protector is in place on the steering wheel.

When applied, of course, the portion of the protector engaged by the wheel will stretch more than the edges of the protector. This difference causes edges 9 and 10 of the protector to lie substantially flat at the top and bottom of the steering wheel and be substantially parallel with each other, also as shown in Figure 2.

Advertising 12 may be applied to the protector in any desired form or wording. As shown in Figure 3, the wording is duplicated on the edges 9 and 10 with the wording on each edge upside down with respect to the wording on the other edge. This arrangement insures that the advertising will be arranged for easy reading irrespective of whether edge 9 or 10 is uppermost.

In the modified form shown in Figure 4, the protector 13 is molded with a groove or trough 14 therein. The groove or trough may be molded outward as well as inward, but the inward groove or trough, as shown in Figure 4, is preferred, since it increases the tension of the protector at the portion which engages the periphery of the steering wheel. The modied form is applied to the steering wheel in the manner shown in Figures 1 and 2.

It is believed that the use of my invention is clear from the foregoing description and by reference to the accompanying drawing.

While I have illustrated and described what I now regard as the preferred embodiment of my invention, the construction is, of course, subject to modifications without departing from the spirit of my invention. I, therefore, do not wish to restrict myself to the particular form of construction illustrated and described, but desire to avail myself of all modifications which may fall within the scope of the appended claims.

Having thus described my invention, what I claim and desire to secure by Letters Patent is:

1. A steering wheel protector comprising a continuous, wide, rubber band having the mid-portion of its periphery molded smaller than its edge portions, the reduced portion being arranged to engage the periphery of a steering wheel and the edge portions arranged to be stretched less than the reduced portion and to lie substantially flat at either side of the steering wheel.

2. A steering wheel protector comprising a continuous rubber band, whose edge portions, before the protector is applied to a steering wheel, have at least as large a periphery as the portion between the edge portions which is adapted to engage the outer circumference of a steering wheel, the band being wide enough for the edge portions to project inward from the inner circumference of the steering wheel, such projecting edge portions being sufficiently wide for them together to surround the steering wheel rim transversely.

3. A steering wheel protector comprising a continuous band of normally limp rubber of substantially uniform thickness throughout to provide a smooth round, friction surface upon the steering wheel, the band being wide enough for the edge portions to project inward a substantial distance from the periphery of the protector, to surround the steering wheel rim transversely, when in use.

4. A steering wheel protector comprising a continuous band of normally limp rubber of substantially uniform thickness throughout to provide a smooth, round, friction surface when in place on the steering wheel, the band being provided with grooves substantially at either edge of said friction surface, the band being wide enough for the edge portions to project inward a substantial distance from the periphery of the protector, to surround the steering wheel rim transversely, when in use.

ALFRED J. ILLER.